Feb. 28, 1928.
L. D. SOUBIER
GLASS FEEDER
Filed July 5, 1923
1,660,429
2 Sheets-Sheet 1
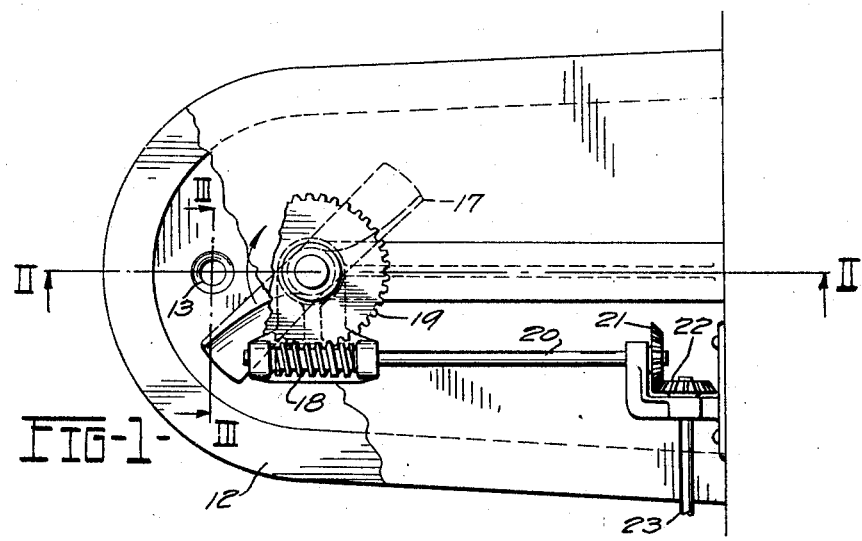
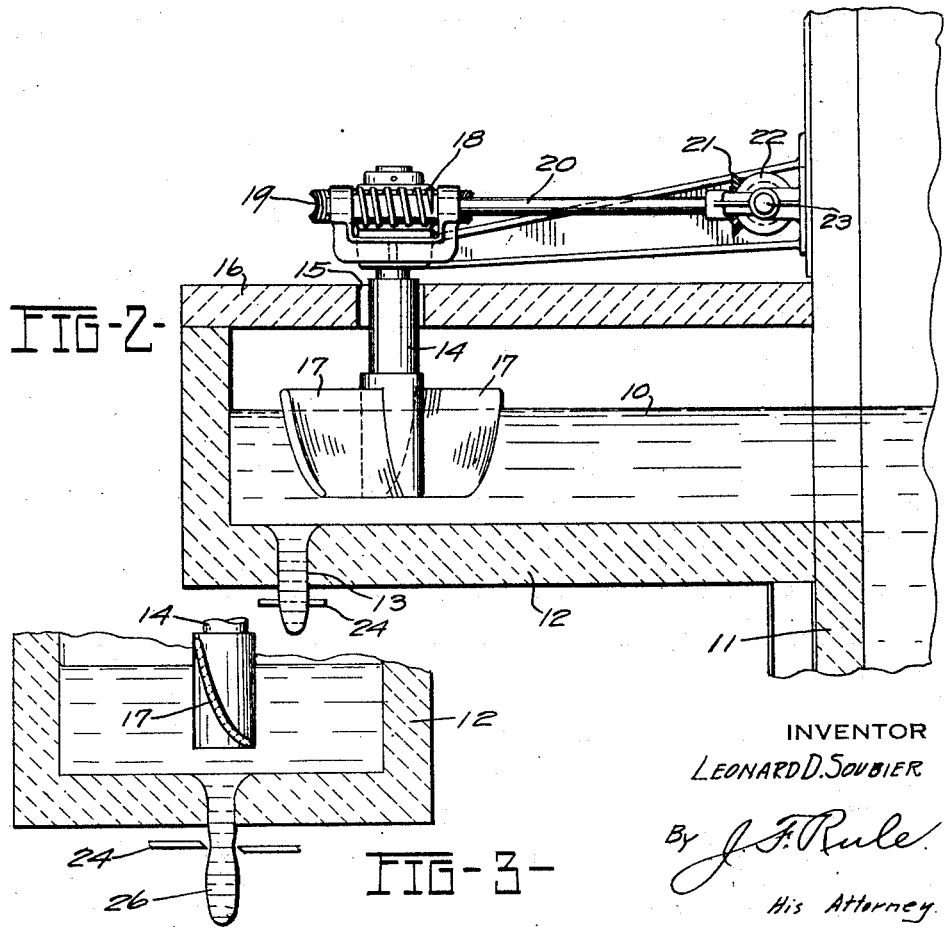
INVENTOR
LEONARD D. SOUBIER
By J. F. Rule
His Attorney.

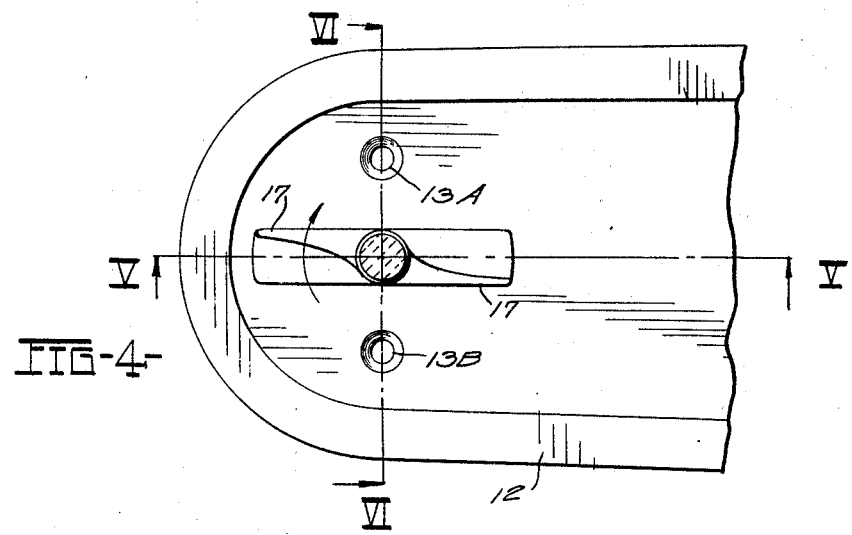
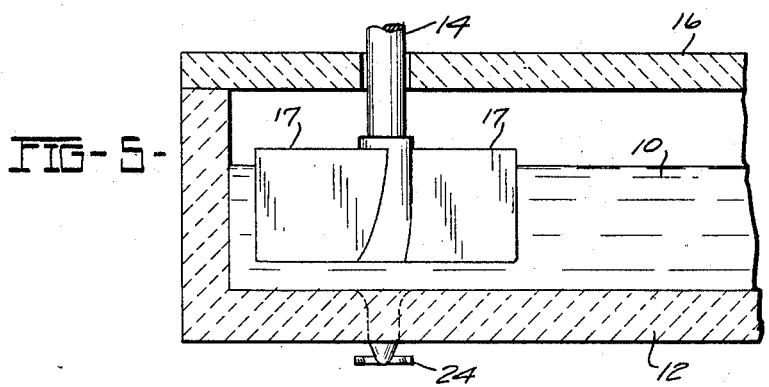
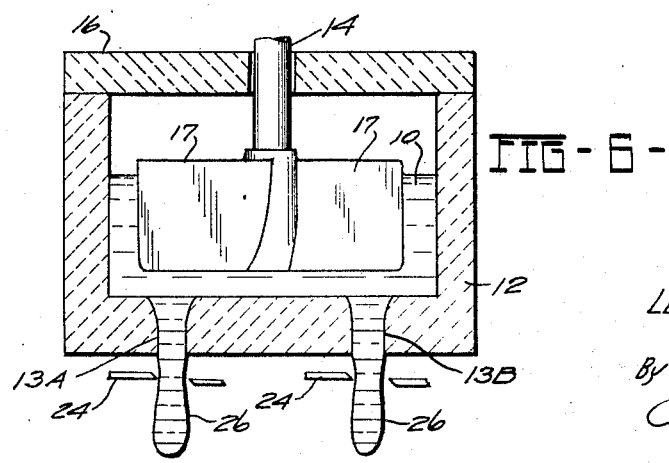

Patented Feb. 28, 1928.

1,660,429

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed July 5, 1923. Serial No. 649,545.

The present invention relates to glass feeders adapted for delivering individual masses or charges of molten glass suitable for entering the molds of a glass forming machine. More particularly, the invention relates to that type of feeder in which the molten glass is delivered through an outlet opening or openings in the bottom of a container to which the glass is supplied, means being provided for periodically varying and controlling the discharge.

An object of the invention is to provide improved means for controlling the discharge of glass, which will at the same time produce a circulation of the glass within the container, adapted to prevent stagnation and chilling of the glass at one side of the outlet, thus preventing "cold streaks" or unevenness in the temperature of the issuing glass. The ultimate object of maintaining an even temperature of the issuing glass is to avoid the defects in the finished ware which are the result of such unevenness of temperature.

Other objects of the invention will appear hereinafter.

In the accompanying drawings:

Figure 1 is a plan view, parts being broken away, showing a glass feeder constructed in accordance with the present invention.

Figure 2 is a sectional elevation at the plane of the line II—II on Figure 1.

Figure 3 is a section at the line III—III on Figure 1.

Figures 4, 5 and 6 illustrate a modification in which a plurality of outlet openings are provided. Figure 4 is a plan view. Figures 5 and 6 are sectional elevations at the lines V—V and VI—VI respectively on Figure 4.

Referring particularly to Figures 1, 2 and 3, the molten glass 10 is supplied from a furnace 11 to a container 12, herein shown as the usual furnace boot or forehearth. The boot is provided with an outlet opening 13 in the floor thereof near its forward end, through which the glass issues.

The flow of glass is controlled by a regulator comprising a vertical shaft 14 extending downward through an opening 15 in the cover 16 of the boot. Attached to the shaft 14 are propeller blades 17 which extend downward in the glass, the lower edges of said blades being spaced a short distance above the floor of the boot. The regulator is rotated continuously by means of a worm 18 running in mesh with a worm gear 19 keyed to the shaft 14. The worm 18 is carried on a shaft 20 connected through gears 21 and 22 to a drive shaft 23.

The shaft 14 is positioned eccentrically of the outlet opening 13 so that the blades 17 as they rotate are moved alternately over the outlet. Each blade as it approaches said outlet, exerts an expelling force on the glass flowing through the outlet, thereby accelerating the flow. As the blade passes beyond the outlet, it exerts a retarding force or upward pull on the glass in said outlet, thereby temporarily retarding the flow. A pair of shears 24 operates in synchronism with the movements of the propeller blades to perodically sever the issuing glass. The shears may be operated by any suitable mechanism (not shown).

The rotation of the blades 17 within the glass causes a continuous circulation of the glass in the boot and prevents stagnation or chilling of the glass at the forward end of the boot. There is thus maintained a uniform temperature and homogeneity of the issuing glass, so that the latter is free from cold streaks or unevenness of temperature. It will be noted that the regulating device comprising the blades 17 serves the double purpose of periodically controlling the issuance of the glass and maintaining a proper circulation in the boot.

Figures 4, 5 and 6 illustrate a modification in which a plurality of outlet openings $13^A$ and $13^B$ are provided. The shaft 14 is in this instance located between the two openings with its axis in the same vertical plane as the axes of the two openings. With this arrangement, the two blades 17 exert their controlling action on the issuing glass at the two outlets simultaneously. That is to say, an expelling force is being applied to the glass at the two outlets at the same time. The retarding action is also applied at the two outlets simultaneously. As a result, two issuing gobs 26 are simultaneously produced. Two pairs of shears 24 may be provided, as shown in Figure 6, to simultaneously sever the suspended gobs 26.

It will be understood that the number of outlets might be increased, if desired. It will also be understood that the invention is not limited to the particular number of propeller blades 17 herein shown. The number can be increased. Also, in some instances a single propeller blade might be used either in connection with a single outlet or with a plurality of outlets.

Various other modifications may be resorted to within the spirit and scope of my invention.

What I claim is:

1. Glass feeding apparatus comprising in combination a container for molten glass having a discharge outlet, a rotatable regulator extending into the glass at one side of the outlet with its axis parallel with the axis of said outlet, and means to rotate the regulator and periodically move portions over the outlet to effect periodic control of the issue of glass through the outlet.

2. Glass feeding apparatus comprising in combination a receptacle to contain molten glass, said receptacle having an outlet in the bottom thereof, a movable regulator in the glass in the receptacle, and automatic means to move portions of the regulator in a horizontal circular path and periodically over the outlet to effect periodic control of the issue of glass through the outlet.

3. Glass feeding apparatus comprising in combination a receptacle to contain molten glass, said receptacle having an outlet opening in the bottom thereof, a movable regulator in the glass in the receptacle, and means to rotate said regulator about a vertical axis located at one side of the outlet and cause portions of said regulator to periodically sweep over the outlet to effect periodic control of the discharge of glass through the outlet.

4. Glass feeding apparatus comprising in combination, a receptacle to contain molten glass, said receptacle having an outlet opening in the bottom thereof, a regulator comprising a rotatable propeller in the glass in the receptacle, and means to move the regulator in a horizontal circular path and periodically cause portions of the propeller to pass over the outlet and control the discharge of glass through the outlet.

5. Glass feeding apparatus comprising, in combination, a receptacle to contain molten glass, said receptacle having an outlet opening in the bottom thereof, and a regulator within the receptacle comprising propeller blades, means to actuate the regulator and cause the propeller blades to work in the glass in the receptacle and control the discharge of glass through said outlet, the propeller blades being successively moved over said outlet.

6. In a glass feeder, the combination of a furnace, a furnace boot or extension having an outlet opening in the floor thereof, means to control the discharge of glass through said opening comprising a vertical shaft extending into said boot at one side of the outlet, a propeller blade carried by and projecting laterally from said shaft, and means to rotate the shaft and cause said blade to periodically sweep over said outlet.

7. In a glass feeder, the combination of a furnace, a furnace boot or extension having an outlet opening in the floor thereof, means to control the discharge of glass through said opening comprising a vertical shaft extending into said boot at one side of the outlet, a propeller blade carried by and projecting laterally from said shaft, and means to rotate the shaft and cause said blade to periodically sweep over said outlet, said blade being inclined to its direction of movement.

8. Glass feeding apparatus comprising, in combination, a receptacle to contain molten glass having an outlet opening in its bottom, means for circulating the glass within the receptacle comprising a device projecting into the glass and rotatable horizontally about an axis at one side of the outlet opening, means for rotating the device, and causing portions thereof to periodically sweep over the outlet to successively expel and retard flow of glass through the outlet.

9. Glass feeding apparatus comprising, in combination, a receptacle to contain molten glass having an outlet opening in its bottom, means for circulating the glass within the receptacle comprising a device projecting into the glass and rotatable horizontally about an axis at one side of the outlet opening, and means to rotate the device and periodically move portions over said outlet opening to control the issue of glass through said opening, said outlet opening being beneath the path of rotation of said device.

10. In glass feeding apparatus, the combination of a container for molten glass having an outlet opening in the bottom thereof, a regulator within the glass in the container, and means to move said regulator continuously in a definite horizontal path above said outlet opening and bring the regulator periodically over the outlet opening and thereby effect a periodic control of glass flow through the outlet by said regulator.

11. In glass feeding apparatus, the combination of a container for molten glass having an outlet opening in the bottom thereof, a regulator within the glass in the container, and means for moving said regulator continuously in a definite horizontal path above said outlet opening and bringing the regulator periodically over the outlet and thereby causing it to exert periodic expelling and retarding forces on the issuing glass.

12. In a glass feeder, the combination of a receptacle to contain molten glass having an outlet opening in its bottom, a circulating device extending into the glass at one side of the outlet opening, and means for moving the circulating device in a circular path about a fixed axis spaced from that of the outlet and thereby periodically moving portions of the circulating device over the outlet opening to cause periodic successive expulsion and retardation of flow of glass through the outlet opening.

Signed at Toledo, in the county of Lucas, and State of Ohio, this 28th day of June, 1923.

LEONARD D. SOUBIER.